United States Patent
Starita et al.

[15] 3,693,425
[45] Sept. 26, 1972

[54] FORCE MEASURING APPARATUS

[72] Inventors: Joseph M. Starita, 10305 Foxbow Dr., Louisville, Ky. 40223; Christopher W. Macosko, 220-C King St., Princeton, N.J. 08540

[22] Filed: April 30, 1970

[21] Appl. No.: 33,251

[52] U.S. Cl. ............73/133, 73/517 R, 73/141 A, 73/136 R
[51] Int. Cl. .....................................G01l 5/16
[58] Field of Search .....73/133, 117.4, 517 R, 136 R, 73/147; 308/2 A

[56] References Cited

UNITED STATES PATENTS

| | | | |
|---|---|---|---|
| 3,481,192 | 12/1969 | Herzog et al. | 73/136 R |
| 3,023,627 | 3/1962 | Geyling | 73/517 R |
| 3,552,199 | 1/1971 | Pugnaire et al. | 73/141 A |
| 3,561,263 | 2/1971 | Ward et al. | 73/133 |
| 3,427,875 | 2/1969 | Saxl | 73/141 A |
| 3,492,864 | 2/1970 | Kraeling et al. | 73/133 |
| 2,782,636 | 2/1957 | Peucker | 73/147 |
| 3,340,726 | 9/1967 | Armstrong et al. | 73/133 X |
| 3,377,849 | 4/1968 | Lebow | 73/136 X |

*Primary Examiner*—Charles A. Ruehl
*Attorney*—Samuelson & Jacob

[57] ABSTRACT

Apparatus for independently measuring mutually perpendicular forces and torque about the line of action of one said force. A set of four cantilevered beams extends along a pair of X—Y coordinate axes and supports a rigid platform in the X—Y plane. A force receiving means above said X—Y plane and on the Z-axis intersecting the origin of said X—Y axes, is rigidly coupled to said platform, whereby forces applied thereto produce bending in said beams in accordance with the direction of the force. Strain gauge means and bridge circuit means are arranged to detect only strains in said beams resulting from the force desired to be measured.

12 Claims, 13 Drawing Figures

INVENTORS:
JOSEPH M. STARITA
CHRISTOPHER W. MACOSKO

BY: *Samuelson & Jacob*

THEIR ATTORNEYS

INVENTORS:
JOSEPH M. STARITA
CHRISTOPHER W. MACOSKO

BY: *Samuelson & Jacob*

THEIR ATTORNEYS

INVENTORS:
JOSEPH M. STARITA
CHRISTOPHER W. MACOSKO

BY: *Samuelson & Jacob*

THEIR ATTORNEYS

INVENTORS:
JOSEPH M. STARITA
CHRISTOPHER W. MACOSKO

BY: Samuelson & Jacob

THEIR ATTORNEYS

FORCE MEASURING APPARATUS

This invention relates generally to force measuring apparatus, and more specifically relates to apparatus for independently measuring mutually perpendicular forces and the torques present in a complex force system.

In various applications of force measuring technology it is desirable to measure the mutually perpendicular components of force present at a point of force application and the torque applied about the line of action of one such component force. Such need may arise, for example, in a material testing system or the like where one is desirous of knowing how much force is being applied to a test body in each of several orthogonally related directions or how much torque is being applied to such body about the line of action of a force. Similarly, such need may arise in an acceleration measuring environment where one wishes to measure the mutually perpendicular component forces acting on an accelerometer mass or the like.

In instances such as the foregoing, it is, of course, possible to employ distinct and separate means for measuring the various force components, but obviously the cost and cumbersome nature of such duplicative apparatus is undesirable. On the contrary, the preferred apparatus of such purpose should be capable of resolving the force acting on a test body or the like so that independent measurements of such force components are possible with but a single device. While prior art devices are known which are capable of thus yielding independent measurements of components in a complex force system, such prior devices have on the whole been overly complex, difficult to use, and of comparatively low sensitivity. Moreover, they have been poorly adapted to measurement of torques associated with the force system.

In accordance with the foregoing it may be regarded as an object of the present invention to provide apparatus for independently measuring three mutually perpendicular forces and a torque about the line of action of one such force.

It is a further object of the invention to provide apparatus for independently resolving force applied to a point adjoined to the apparatus into three mutually perpendicular components, which apparatus is of high and controllable sensitivity, and of simple, dependable operation.

It is another object of the invention to provide apparatus for independently measuring mutually perpendicular forces, which apparatus is also capable of independently measuring torque about the line of action of one said force, said apparatus further being of high sensitivity when utilized in such torque-measuring mode.

Now, in accordance with the present invention, the foregoing objects, and others as will become apparent in the course of the ensuing specification, are achieved in a construction utilizing a set of four cantilevered support beams, a platform suspendedly supported by said beams, and a force receiving means positioned symmetrically with respect to said beams, above said platform and rigidly connected thereto.

More specifically, the beams are oriented along a set of orthogonal X–Y coordinate axes, with the cantilevered ends of each opposite pair being spaced an equal distance from the origin of the X–Y coordinate system. The cantilevered ends, in turn, support a platform means which lies in the X–Y plane. At a point above the platform and on a Z-axis extending from the X–Y coordinate system origin, is a force receiving means rigidly coupled to said platform. Such force receiving means may, for example, comprise a table adapted to receive test samples at the center thereof.

When a force is applied to the force receiving means, as for example by stressing a test sample present at such means or by accelerating a system to which such means is attached, bending occurs at the several cantilevered beams in accordance with the magnitude and direction of said force (similar considerations apply for a torque). In accordance with the invention, matched sets of strain gauges or the like are present on diametrically opposed sides of the base portions of the support beams. By appropriate connection of such strain gauges to a bridge circuit, strains in the beams not desired to be measured result in readings which cancel in the circuit, whereby only readings corresponding to a component force desired to be measured are actually detected. In accordance, too, with a preferred aspect of the invention, the beams are provided with a configuration adapted to concentrate strains in localized portions thereof, the strain gauges being positioned at such localized portions, whereby the overall sensitivity of the apparatus is greatly enhanced. The term "sensitivity" as employed herein means the ability to read forces with minimum deflection of the force receiving means.

The invention is diagrammatically illustrated, by way of example, in the appended drawings, in which.

Figure 1:
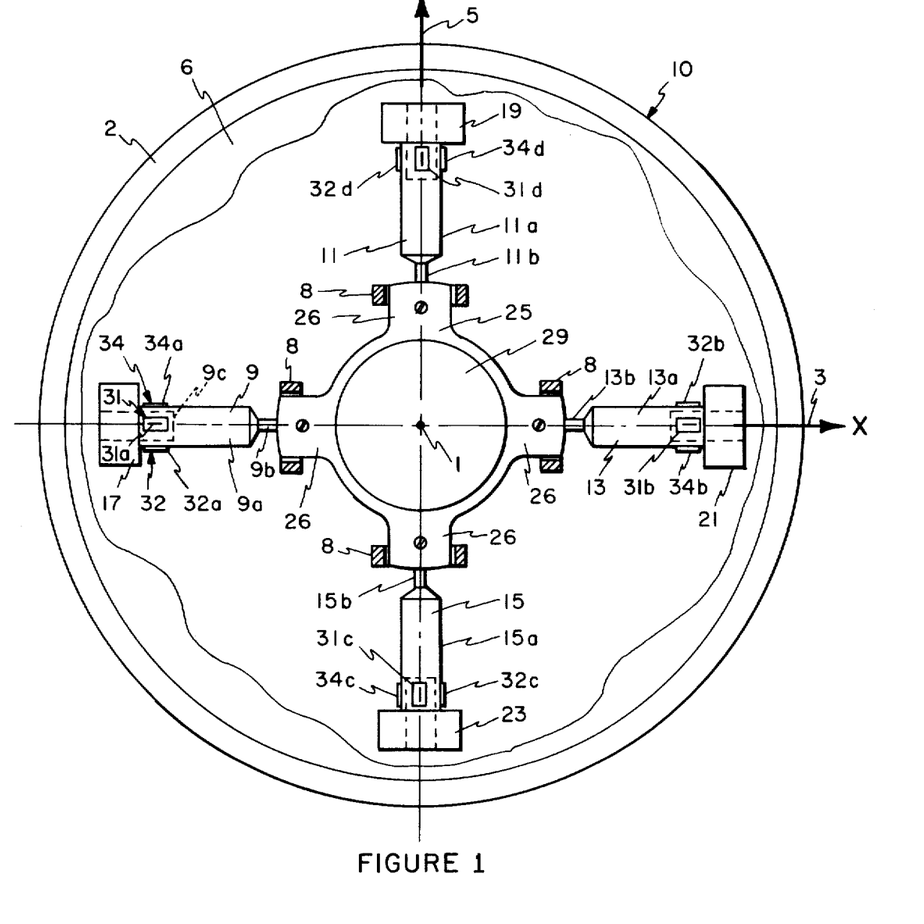
FIG. 1 is a plan view of apparatus constructed in accordance with the present invention.
Figure 2:
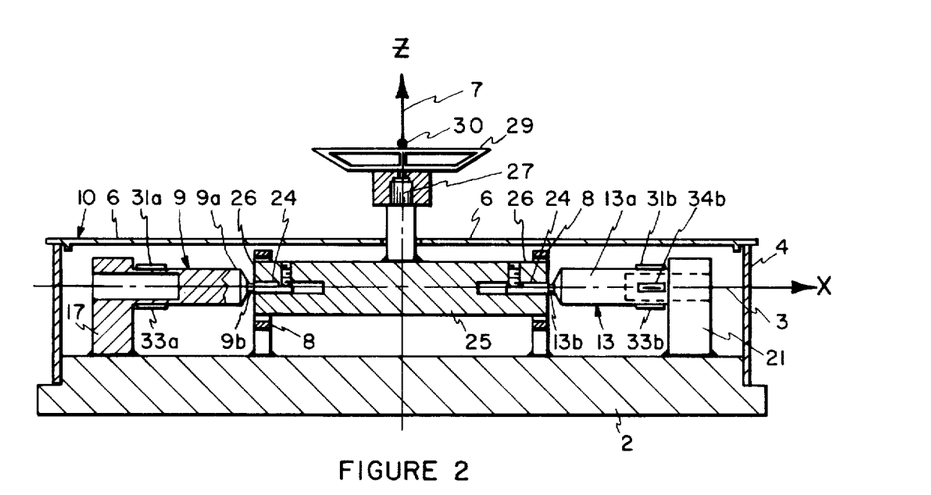
FIG. 2 is an elevational, partially sectioned, view of the FIG. 1 apparatus.

In FIGS. 1 and 2, plan and partially sectioned elevational views are respectively depicted of apparatus in accordance with the present invention. For purposes of concretely illustrating the configuration of the apparatus and the manner in which orthogonally directed component forces are measured by the apparatus, it will be seen that the device is superimposed upon a rectangular coordinate system with an origin at point 1; the X-axis thereof is thus depicted at reference numeral 3; the Y-axis at 5; and the Z-axis at 7. It will of course be understood that the use of a particular coordinate system in this manner is not intended to delimit the invention otherwise set forth, but only to provide a reference system for explaining the operation of the invention.

It is seen in these FIGURES that the apparatus includes four support beams 9, 11, 13 and 15, which beams are supported at one end thereof by a series of integral supports 17, 19, 21 and 23. The beams are thus seen (particularly in FIG. 2) to be cantilevered from each respective support. The four beams are symmetrically oriented with respect to origin 1 of the X-Y-Z coordinate system, and are each aligned with one of the four segments of X-Y axes radiating from origin 1. Each beam 9, 11, 13 and 15, extends from its respective support member for the major portion of its length as a first portion, such as 9a, 11a, 13a and 15a; the beam thence is reduced in cross section, as at end portions 9b, 11b, 13b and 15b whereat such beams carry pin portions 24 which are joined to a rigid platform 25. The ends 9b, 11b, 13b and 15b of the several beams are, in this instance, spaced equidistantly from origin 1, and in the embodiment shown platform 25 is generally circular in form with radially extending arms 26 and is suspended clear of base 2 of the apparatus by the support beams.

In FIG. 2, particularly, it is seen that the components of the apparatus thus far discussed are contained within the enclosure 10 defined by base 2, wall 4 and cover member 6. Enclosure of the several cited components within enclosure 10 in this manner is not essential to the invention, but is useful in protecting the apparatus and in some applications in that temperature regulation may be readily provided within enclosure 10, as by cooling coils or the like.

Affixed to platform 25, aligned with the Z-axis and extending therealong, is a rigid columnar member 27, which, in turn, supports at the upper end thereof a force receiving means 29. Force receiving means 29 in the present embodiment takes the form of a table, upon which — as will be subsequently discussed — test samples of objects to be stressed or the like may be centered and subjected to force imposition and analysis.

As will be appreciated from the discussion thus far set forth, the system of the present apparatus consists basically of the four cantilevered support beams 9, 11, 13 and 15, which elements support in suspended fashion the rigid combination of platform 25, columnar member 27 and force receiving means 29. Considering the axial point 30 as that point at which X, Y or Z-directed forces or force components act, it will be immediately evident that the rigid combination of platform 25, member 27, and means 29, will in response to such force tend to be displaced as a unit, and assuming some flexibility in support beams 9, 11, 13 and 15, it will be evident that bending of such beams will occur in accordance with the direction and magnitude of the applied force. Some consideration will also make clear that the particular orthogonal arrangement of the beams with respect to the rigid combination supported thereby, is such that certain specific types of bending occur depending upon the direction of the applied force, a point which will be discussed subsequently and which makes possible independent measuring of mutually perpendicular forces or components. Reference is made here, for example, to the fact that X-directed forces at point 30 will necessarily cause equal and oppositely directed bending in beams 9 and 13, but will produce no bending in beams 11 and 15.

Two more points may be noted in connection with the discussion of the rigid combination of platform 25, columnar member 27 and force receiving means 29: Firstly, member 27 serves essentially as a rigid coupling between the point 30 of force application and the underlying platform 25. In view of this, it should be evident that the force receiving means 29 could be positioned on the Z-axis above platform 25 by other rigid structure connecting such means to platform 25 — e.g., a bowed arm or the like could provide the desired rigid connection to the underlying platform. Secondly, in the apparatus depicted, point 30 is displaced along the Z-axis a distance approximately equal to the distances separating the cantilevered ends of the support beams from origin 1; the equality of these distances has some simplifying effects in design of the apparatus, but it will be appreciated that by utilizing longer columnar means 27 — i.e., by displacing the point 30 further from the origin on the Z-axis, greater sensitivity in the apparatus is enabled in the X and Y force sensing means.

Figure 3:
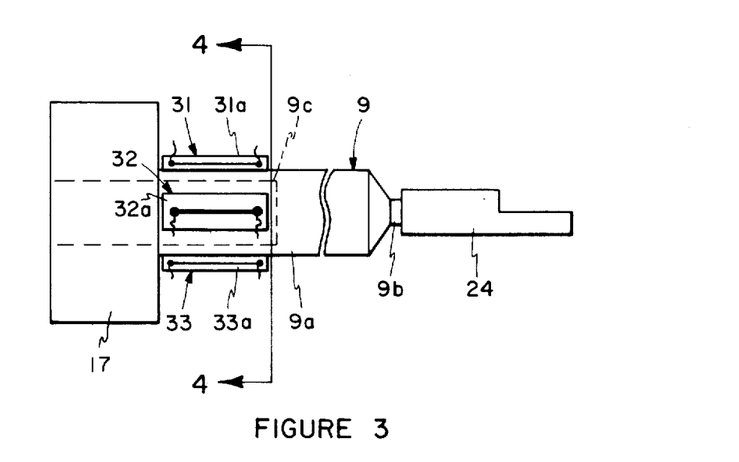
FIG. 3 is an enlarged side elevational view of one of the support beams of the apparatus.
Figure 4:
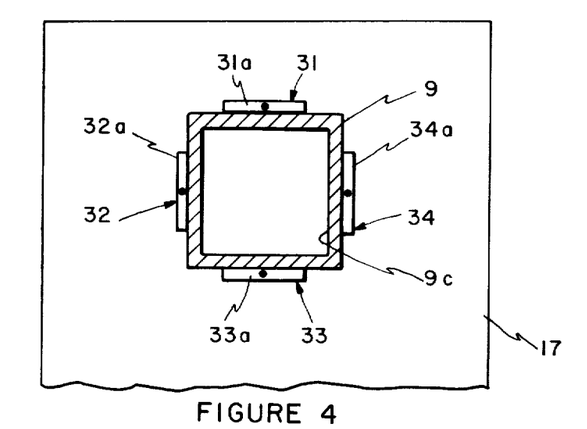
FIG. 4 is a cross-sectional view of a support beam, taken along the line 4—4 of FIG. 3.

In accordance with the present invention, forces applied at force receiving means 29 thus deflect the several support beams by bending such beams in accordance with the movement of platform 25. In FIGS. 2, 3 and 4, it is seen that a representative beam 9 is typically of generally rectangular cross section, and includes a first portion 9a extending along the major portion of the distance from support 17 to platform 25, a greatly reduced-in-cross-section second portion 9b and a pin portion 24 which actually connects the beam 9 to platform 25. The portion 9b acts essentially as a pivot or hinge connection between the beam and the platform. As best seen in FIGS. 1 and 2, each radial arm 26 of the platform 25 is surrounded by a stop ring 8 which ordinarily does not contact a corresponding arm 26, but which serves as a positive stop to limit maximum movement of the platform as the support beams 9, 11, 13 and 15 bend.

The beam 9 is solid for most of its length, but adjacent the supported portion thereof includes a hollow portion 9c. Such hollow portion 9c coincides with the affixation on the beam surfaces of strain gauges designated generally as 31, 32, 33 and 34. The strain gauges 31 – 34 (four such gauges are present on each beam) are of any well-known conventional construction, including, for example, simple wire strain gauges or single filament elements of silicon, or even piezoresistive members, all of which exhibit the property of varying in resistance in a manner substantially porportional to the magnitude of the strain which may be imposed thereon. By virtue of the beam construction set forth, bending of the beams is largely confined to the limited portion 9c, and by locating the gauges at such points of strain concentration while at the same time keeping the gauges spaced the maximum distance from the central (neutral) axis of each beam the sensitivity of the overall apparatus is correspondingly increased. The rectangular cross-section provides flat surfaces which enable ready attachment of the strain gauges, as well as relatively undistorted strain at the locale of the attachment.

Figure 5:
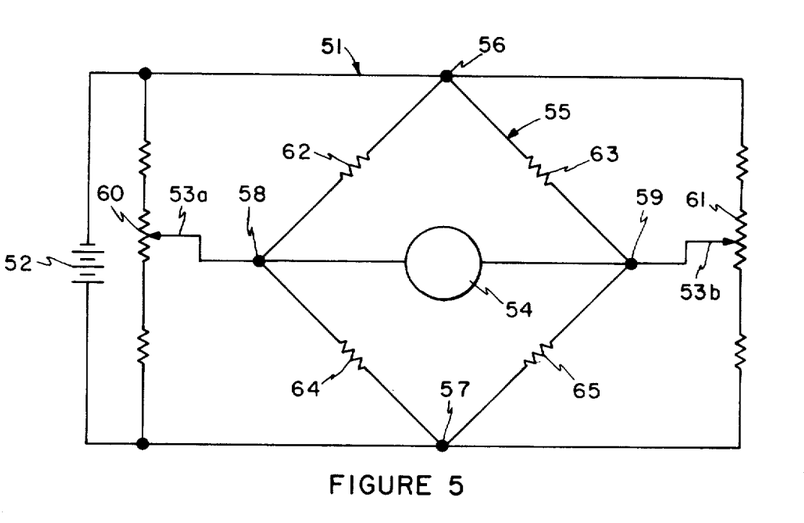
FIG. 5 is a schematic electrical diagram illustrating a suitable bridge circuit arrangement for use with the invention.

In FIG. 5 an electrical schematic diagram illustrates a simple bridge circuit 51 utilizable with the invention. Such circuit includes a source of constant E.M.F. 52 connected to terminals 56, 57 of a bridge generally designated at 55. The other pair of bridge terminals 58, 59 are electrically connected to movable contacts 53a, 58b, which contacts are ganged and moved in opposite directions on potentiometers 60 and 61. In accordance with the invention, resistances 62, 63, 64 and 65, in the several bridge arms, will correspond to selected of the strain gauges such as 31, 32, 33 and 34. The movable contacts 53a and 53b are adjusted so that the bridge 55 will be balanced when no forces are applied to the apparatus of the invention, and that voltage detector 54 connected across terminals 58, 59 will indicate a null. In the presence of force at force receiving means 29, bridge 55 will in general (depending upon which gauges are connected in the bridge arms) not be balanced. The imbalance is read on the voltage detector 54. In such instance it will be clear that the voltage imbalance will be a simple function of the resistive changes in the several bridge arms, and from such changes and a calibration with known forces the unknown forces acting can be determined in straightforward fashion.

In accordance with the invention, appropriate of the several strain gauges are connected to circuit 55 as to enable independent measuring of X, Y, or Z-directed forces or force components, or independent measuring of the torque applied about the Z-axis. The manner in which the present invention enables such result may be illustrated by reference to FIGS. 6 through 9, which diagrammatically and schematically depict interaction of X, Y and Z-directed forces, and torque about the Z-axis, with the apparatus, and illustrate how forces not desired to be measured are cancelled in their effects at the bridge circuit.

Figure 6:
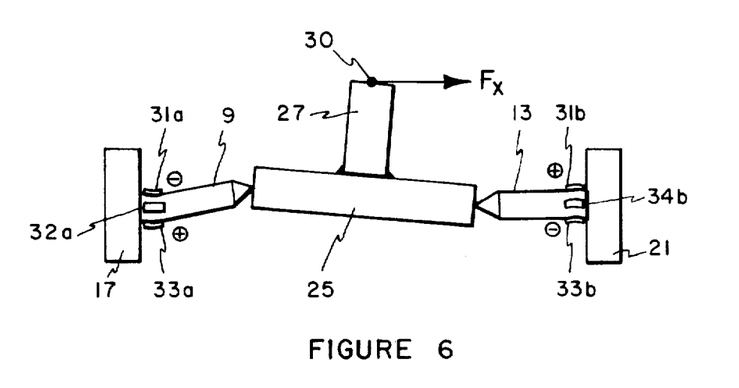
FIG. 6 depicts in a diagrammatic fashion the manner in which an X-directed force interacts with the apparatus.
Figure 6A:
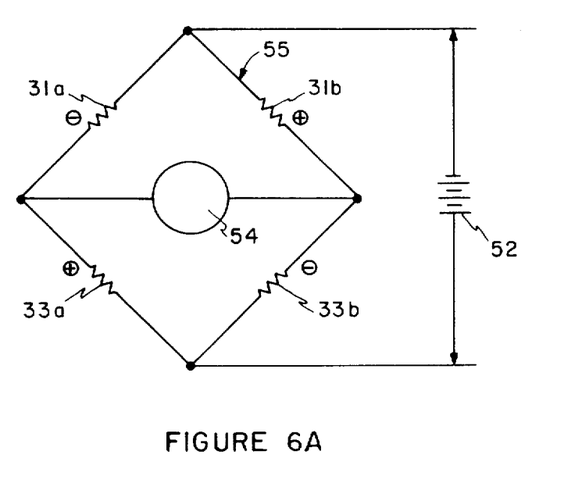
FIG. 6A depicts by a simplified schematic circuit diagram, the manner in which the said X-directed force is independently measured.

Thus, in FIGS. 6 and 6A the effect of a force $F_x$ acting at the schematically depicted point 30 (corresponding to such point in FIG. 2) and along a line in the X-direction, is suggested. Firstly, it will be evident here that only bending of the support beams 9 and 13 need be considered if only the X-directed force is to be measured. That is to say that consequential bending does not occur in beams 11 and 15 since only a pivoting action about portions 11b and 15b of such beams occurs by virtue of an X-directed force.

In the case of the beams 9 and 13 however, the force $F_x$ acts to rotate platform 25 somewhat clockwise (in the sense of FIG. 6), whereby beam 9 is bent somewhat upwardly and beam 13 is correspondingly bent somewhat downwardly. The effects on the two opposing beams, and on the strain gauges is suggested by the polarity signs + and −, intended to indicate, e.g., in the case of beam 9 that the top side thereof is under compression and the bottom side under tension — with corresponding effect on the strain gauges 31a and 33a attached to the centers of such sides. In this connection it should be noted that for the force under consideration ($F_x$), the bending of beams 9 and 13 is such that no appreciable effect occurs at gauges such as 32a, 34a or 32b, 34b on the sides of such beams parallel to the direction of displacement.

In order now to independently measure the magnitude of the X-directed force $F_x$, the gauges 31a, 33a, 31b and 33b, are connected to the bridge circuit of FIG. 5 in the manner shown in the simplified schematic FIG. 6A. It will here be noted that with the circuit and mechanical arrangement illustrated, neither Z nor Y-directed forces will interfere with measurement of the X-directed force, nor will the presence of torque about the Z-axis. Thus, in the case of Z-directed forces, the effect on the beams 9 and 13 will be such as to bend them both downwardly in equal amounts, whereby gauges 31a and 31b are affected in an identical way, as are gauges 33a and 33b. These gauges are selected so that their response to strain is identical, i.e., their gauge factors are matched. Since gauges 31a and 31b are located in adjacent bridge arms, (as in the case too for gauges 33a and 33b) the net effect of the displacements caused by a Z-directed force is cancelled in so far as the circuit arrangement of FIG. 6A is concerned. It will also be clear that Y-directed forces will not affect the bridge arrangement of FIG. 6A to any degree, in that upward or downward displacement of the beams 9 and 13 is not effected by such a force. Similar considerations apply in the case of a torque applied about the Z-axis.

Figure 7:
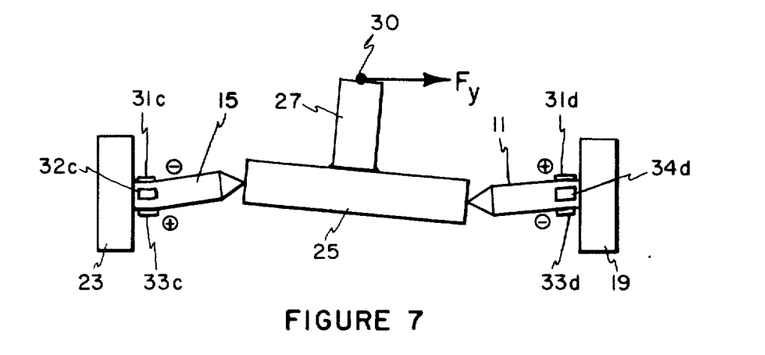
FIGS. 7 and 7A show, in analogy to FIGS. 6 and 6A, how Y-directed forces are independently measured by the apparatus.
Figure 7A:
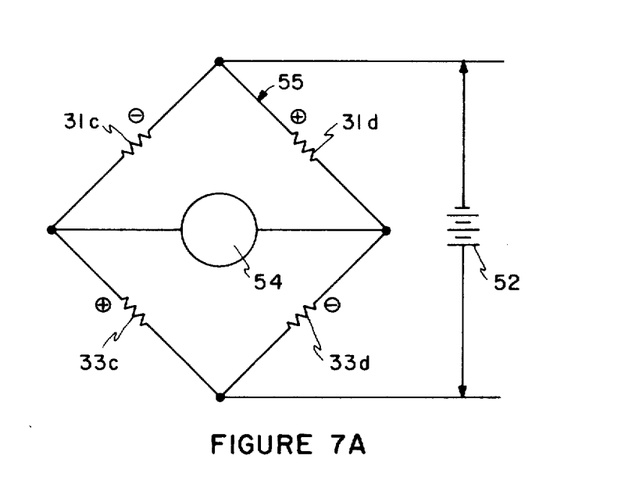

FIGS. 7 and 7A are precisely analagous to FIGS. 6 and 6A, and illustrate how a Y-directed force, Fy, is independently measured by the apparatus. In analogy to the description in connection with FIGS. 6 and 6A, it will be evident in the present FIGURES that neither Z-forces, X-forces, nor torques about the Z-axis will affect the independent determination of Fy.

Figure 8:
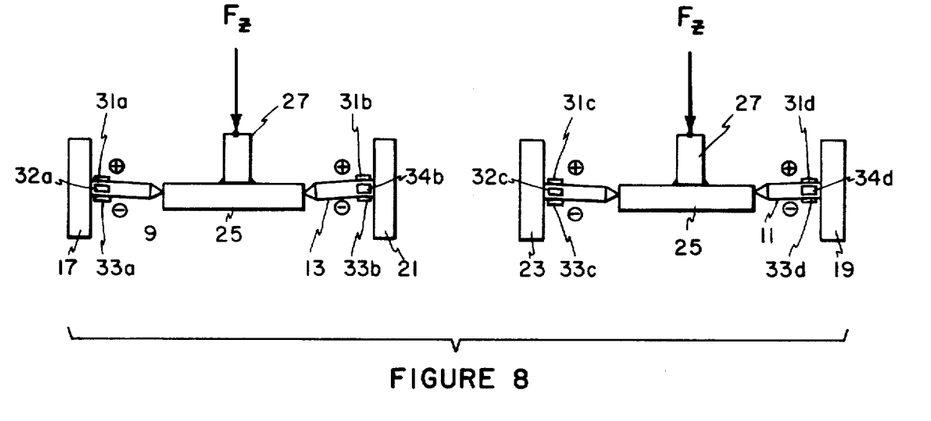
FIGS. 8 and 8A show, in analogy to FIGS. 6, 6A, 7 and 7A, how Z-directed forces are independently measured by the apparatus.
Figure 8A:
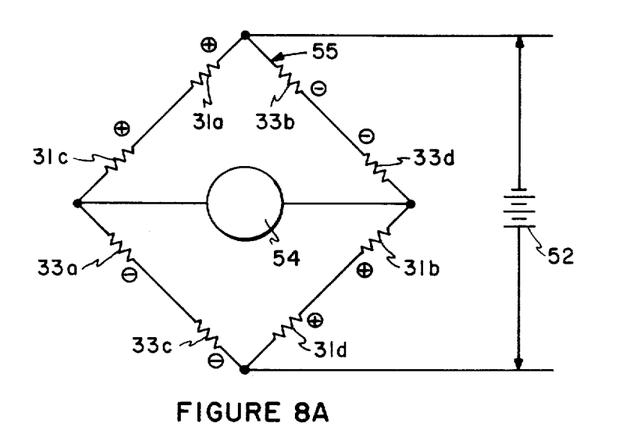

FIGS. 8 and 8A illustrate how a Z-directed force is independently measured by the apparatus. FIG. 8 is broken up into two diagrammatic side views in order to illustrate that downward bending of both the opposed beam pair 9, 13, and the pair 15, 11 is now involved. In the present instance, it is seen to that each arm of the bridge 55 now carries two series-connected strain gauges. Once again, however, consideration of the manner in which other than Z-directed forces will interact with the apparatus and the bridge connections, will make clear that neither X nor Y-directed forces, nor torques about the Z-axis will have an effect on bridge balance, in that the specified torque will not in any event substantially strain the upper or lower sides of the beams, and in that X or Y directed forces will merely introduce equal resistance changes in adjacent bridge arms — whereby the net effect on bridge balance is zero.

Figure 9:
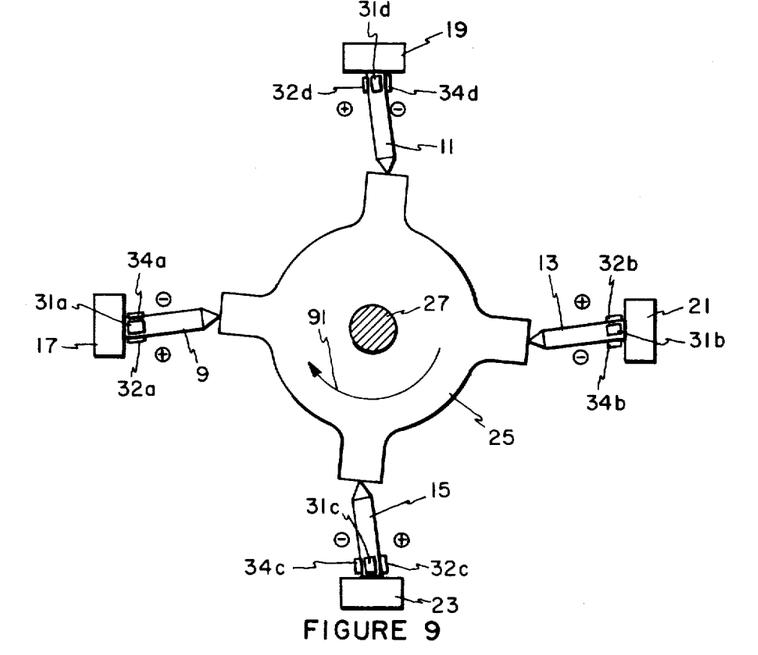
FIGS. 9 and 9A in diagrammatic and schematic fashion depict, respectively, the manner in which a torque applied about the line of action of a Z-directed force interacts with the apparatus, and the manner in which such force is independently measured at the bridge circuit thereof.
Figure 9A:
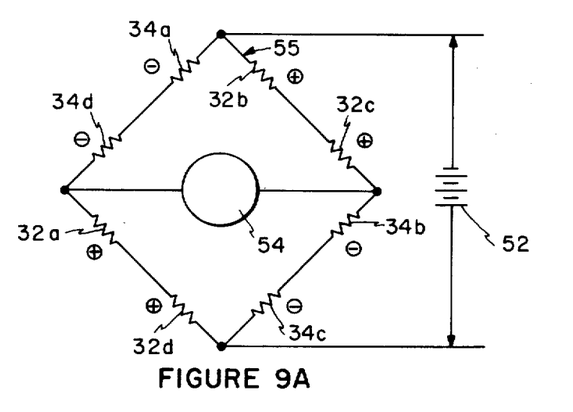

Finally, in FIGS. 9 and 9A, diagrammatic and schematic illustration is made of the manner in which a torque applied about the Z-axis is independently measured. The view therein shown essentially corresponds to FIG. 1. The torque is question is assumed to be applied to force receiving means 29 in the direction indicated by arrow 91. Such torque typically will represent a twisting moment or the like applied to a slab of test material, e.g., a piece of plastic, positioned atop force receiving means 29. It could, of course, also be a reaction force imposed by axial acceleration of means 29 about the Z-axis passing through point 30.

In any event such force produces deflections by bending of the several beams in the manner suggested by the diagram and accompanying polarity signs. Once again, by a suitable bridge arrangement — that illustrated in FIG. 9A — appropriate strain gauges are connected to the FIG. 5 bridge as to enable measurement of the degree of symmetrical bending of the beams, and thereby of the acting torque. And once again, in continuing analogy to FIGS. 6 through 8, analysis will readily show that except for the desired-to-be-measured torque, neither X, Y, nor Z-directed forces will be detected in the bridge — either because such forces do not affect the gauges connected in the bridge or because changes introduced affect adjacent arms of the bridge to equal degrees.

While a particular embodiment of the invention has been shown and described, it is apparent to those skilled in the art that modifications are possible without departing from the spirit of the invention and the scope of the subjoined claims.

The embodiments of the invention in which an exclusive property or privilege is claimed are defined as follows:

1. Apparatus for independently measuring mutually perpendicular forces applied to a force receiving means and torque about the line of action of one said force, comprising:

a set of four cantilevered support beams extending along a pair of orthogonal X—Y coordinate axes, the cantilevered ends of each pair of opposite beams being equidistantly spaced from the origin of said axes;

a rigid platform means secured and suspended by said cantilevered ends of said beams, said platform means being centered at the origin of said axes;

force receiving means spaced from the plane of said X—Y coordinates on a Z-axis orthogonal to said X—Y axes, said means being rigidly coupled to said platform means whereby X or Y-directed forces applied to said force receiving means equidistantly but oppositely deflects the cantilevered ends of only the pair of said beams extending along the coordinate axis parallel to said force by bending said beams, whereby a Z-directed force applied to said force receiving means deflects said cantilevered ends equidistantly along said Z-axis, and whereby torque about said Z-axis upon said force receiving means deflects equidistantly the said cantilevered ends of said beams in directions parallel to said X—Y plane; and means for measuring the strain in said beams resulting only from the deflections effected by the force desired to be measured, and deriving therefrom the magnitude of said desired force.

2. Apparatus in accordance with claim 1 wherein said beams are reduced in cross-section at said cantilevered ends adjoining said platform to define hinge-like connections between said platform and beams.

3. Apparatus in accordance with claim 1 wherein said force receiving means is coupled to said platform by a columnar member secured to said platform and extending along said Z-axis to said force receiving means.

4. Apparatus in accordance with claim 1 wherein said beams are provided with a configuration which concentrates said strains-to-be-measured in localized portions thereof, said measuring means being adapted to measure said strains in said localized portions.

5. Apparatus in accordance with claim 4 wherein said strain measuring means comprises matched sets of four strain gauges affixed to each of the opposed surfaces of the localized portions of said beams, and bridge circuit means connected to said strain gauges such that bridge-unbalancing electrical changes thereof detected by said bridge circuit means are effected only by the force desired to be measured.

6. Apparatus in accordance with claim 4 wherein said localized portions are proximate the supported ends of said beams.

7. Apparatus in accordance with claim 6 wherein said beams are hollow in at least said localized portions.

8. Apparatus in accordance with claim 6 wherein said beams are of rectangular cross-section at at least said localized portions.

9. Apparatus in accordance with claim 6 wherein said strain measuring means comprises matched sets of four strain gauges affixed to each of the opposed surfaces of the localized portions of said beams, and bridge circuit means connected to said strain gauges such that bridge-unbalancing electrical changes thereof detected by said bridge circuit means are effected only by the force desired to be measured.

10. Apparatus in accordance with claim 9 wherein said beams are reduced in cross-section at said cantilevered ends adjoining said platform to define hinge-like connections between said platform and beams.

11. Apparatus in accordance with claim 10 wherein said force receiving means includes a flat surface parallel to said X—Y plane, said surface being adapted to receive material thereon for subjection to force testing.

12. Apparatus in accordance with claim 10 wherein the cantilevered ends of each of said beams are equidistantly spaced from the origin of said axes and said force receiving means is positioned along said Z-axis at a spacing from the origin of said coordinate axes equal to the spacing of the cantilevered ends of said beans from said origin.

* * * * *